United States Patent
Hewitt et al.

(10) Patent No.: US 9,516,522 B1
(45) Date of Patent: Dec. 6, 2016

(54) PRIORITY MESSAGE MANAGEMENT

(71) Applicant: INTERNATIONAL BUSINESS MACHINES CORPORATION, Armonk, NY (US)

(72) Inventors: James Hewitt, Eastleigh (GB); Colin I. Holyoake, Braishfield (GB); Richard Postlethwaite, Salisbury (GB); Caroline J. Thomas, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/845,583

(22) Filed: Sep. 4, 2015

(51) Int. Cl.
  *H04M 3/42* (2006.01)
  *H04M 1/663* (2006.01)
  *H04W 24/02* (2009.01)

(52) U.S. Cl.
  CPC .................... *H04W 24/02* (2013.01)

(58) Field of Classification Search
  None
  See application file for complete search history.

(56) References Cited

U.S. PATENT DOCUMENTS

| | | |
|---|---|---|
| 8,693,654 B2 | 4/2014 | Kashen et al. |
| 8,805,328 B2 | 8/2014 | Varanasi |
| 8,929,875 B2 | 1/2015 | Youst |
| 9,338,675 B1 | 5/2016 | Hewitt et al. |
| 2004/0223599 A1 | 11/2004 | Bear et al. |
| 2007/0032225 A1* | 2/2007 | Konicek ........... H04M 1/72513 455/417 |
| 2009/0264116 A1 | 10/2009 | Thompson |

OTHER PUBLICATIONS

Whitwam, R., "You Can Now Allow Just Priority Notifications When You Don't Want to be Disturbed, or Avoid Getting Interrupted Altogether", [Lollipop Feature Spotlight], Oct. 17, 2014, pp. 1-9, <http://www.androidpolice.com/2014/10/17/lollipop-feature-spotlight-you-can-now-set-notifications-as-priority-instead-of-just-on-or-off/>.
"Automatic silent mode disabling mechanism based on the frequency of incoming calls from the same number", An IP.com Prior Art Database Technical Disclosure, Authors et. al.: Disclosed Anonymously, IP.com No. 000225207, IP.com Electronic Publication: Jan. 30, 2013, pp. 1-2, <http://null/IPCOM/000225207>.

(Continued)

*Primary Examiner* — Erika Washington
(74) *Attorney, Agent, or Firm* — Brian M. Restauro; William H. Hartwell

(57) ABSTRACT

Embodiments of the present invention provide methods, computer program products, and systems for priority message management. In one embodiment, users are associated with one or more identified networks, wherein the users connect to the one or more identified networks using one or more mobile devices. Embodiments of the present invention can detect the presence or absence of an associated user, and responsive to detecting a user's absence, can increase an amount of priority of a user's communications to a mobile device of a different user having an enabled screening feature. Increasing the amount of priority of users that have been identified as absent from the identified network can ensure important messages are delivered.

20 Claims, 4 Drawing Sheets

(56) References Cited

OTHER PUBLICATIONS

"Nights Keeper (do not disturb)", Android Apps on Google Play, pp. 1-4, printed on Jul. 15, 2015, <https://play.google.com/store/apps/details?id=com.nightskeeper&hl=en>.
U.S. Appl. No. 15/077,111 Entitled "Priority Message Management", filed Mar. 22, 2016, 2016.
Appendix P.: List of IBM Patents or Patent Applications Treated as Related, Dated Mar. 22, 2016, 2 pages.
U.S. Appl. No. 14/976,377 Entitled "Priority Message Management", filed Dec. 21, 2015.
Appendix P.: List of IBM Patents or Patent Applications Treated as Related, Dated Jan. 26, 2016, 2 pages.

* cited by examiner

PRIORITY MESSAGE MANAGEMENT

BACKGROUND

The present invention relates generally to the field of mobile phones, and more particularly to prioritizing calls on mobile phones.

Mobile devices such as cellular phones support a wide variety of services such as text messaging, multimedia message service (MMS), email, Internet access, short range wireless communications (e.g., Bluetooth) in addition to the ability to make and receive telephone calls. Mobile devices typically have screening features to enable a user to ignore some calls while receiving others.

SUMMARY

Embodiments of the present invention provides methods, computer program products, and systems for priority message management. In one embodiment of the present invention, a method is provided comprising: associating a first user with one or more identified networks, wherein the first user connects to the one or more identified networks using one or more mobile devices; detecting the first user's absence from the one or more identified networks; and responsive to detecting the first user's absence from the one or more identified networks, increasing an amount of priority of the first user's communications to a second user.

DETAILED DESCRIPTION

Embodiments of the present invention recognize that screening features need improvement. In some instances, communications such as phone calls may still be allowed past a screening feature despite there not being an actual emergency. For example, a coworker that has been added to a "favorites" list can bypass the screening feature and still contact the user for a non-emergency event and subsequently wake the user. In other instances, a user on a "favorites" list of a different user may lose the device associated with a number placed on the "favorites" list of the different user and would be left without a way to contact the different user having a "do not disturb" feature activated. Embodiments of the present invention provide solutions for improving screening features by detecting the presence or absence of a registered user to a known, registered network. In this manner, as discussed in greater detail in the specification, embodiments of the present invention can disable an activated screening feature (i.e., a priority mode) of a registered device to ensure important messages are delivered.

Figure 1:
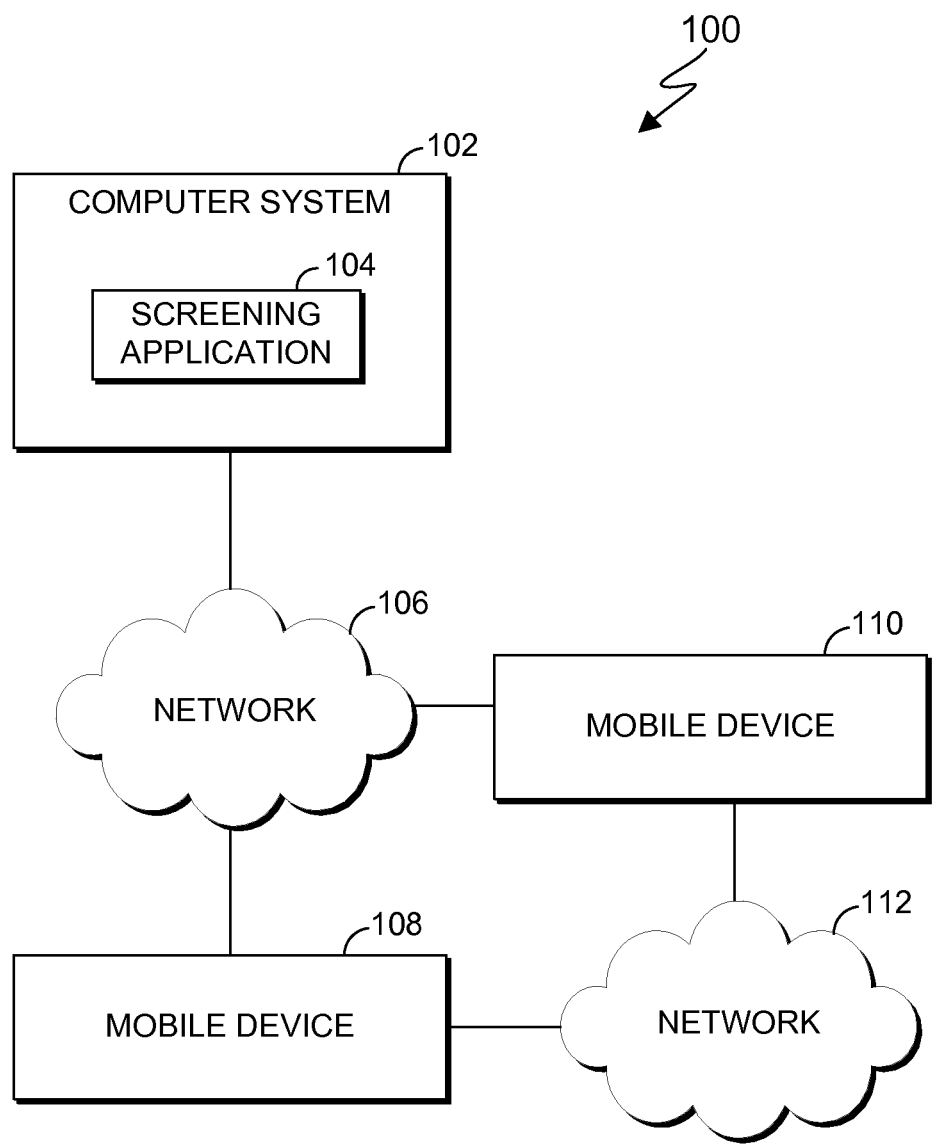
FIG. 1 is a block diagram of computing environment, in accordance with an embodiment of the present invention.

FIG. 1 is a functional block diagram of computing environment 100, in accordance with an embodiment of the present invention. Computing environment 100 includes computer system 102, mobile device 108, and mobile device 110. Computer system 102, mobile device 108, and mobile device 110 can be desktop computers, laptop computers, specialized computer servers, or any other computer systems known in the art. In certain embodiments, computer system 102, mobile device 108, and mobile device 110 represent computer systems utilizing clustered computers and components to act as a single pool of seamless resources when accessed through network 106. For example, such embodiments may be used in data center, cloud computing, storage area network (SAN), and network attached storage (NAS) applications. In certain embodiments, computer system 102, mobile device 108, and mobile device 110 represent virtual machines. In general, computer system 102, mobile device 108, and mobile device 110 are representative of any electronic devices, or combination of electronic devices, capable of executing machine-readable program instructions, as described in greater detail with regard to FIG. 4.

Computer system 102 includes screening application 104. Screening application 104 communicates with mobile device 108 and 110 (via a user interface, not shown) to activate screening features and alter prioritization schema based, at least in part, on device registration and connectivity to a known network, as will be discussed in greater detail with regard to FIGS. 2-3. In other embodiments, screening application 104 can be stored locally on mobile device 108 and 110.

In this embodiment, screening application 104 can register mobile devices (e.g., mobile devices 108 and 110) to a network; monitor presence or absence of a user based, at least in part, on the registered mobile devices and the connection of the registered mobile devices to the registered network; and alter a prioritization schema (e.g., a priority mode, screening feature, do not disturb mode, etc.) so that only messages sent from registered devices unconnected to the known network will bypass the screening feature. For example, two mobile devices A and B, belonging to person alpha and beta respectively, could be registered with screening application 104 and connected to a known network (e.g., their home Wi-Fi). Person alpha has activated the screening feature on device A (i.e., person alpha does not want to be disturbed unless it is an emergency from a family member/close friend/etc.). Person beta leaves the home to meet up with friends and subsequently needs to contact person alpha (for example, for a ride home). Because device B is registered and no longer connected to the home Wi-Fi, a phone call from person beta, originating from device B, will be pushed through and bypass the screening feature activated on device A. In other words, person B can still reach person A despite the enabled screening feature on person A's device. For illustrative purposes, the following discussion is made with respect to computer system 102 facilitating communications between mobile device 108 and 110, it being understood that computer system 102 can facilitate communications between other mobile devices that are not shown.

Figure 2:
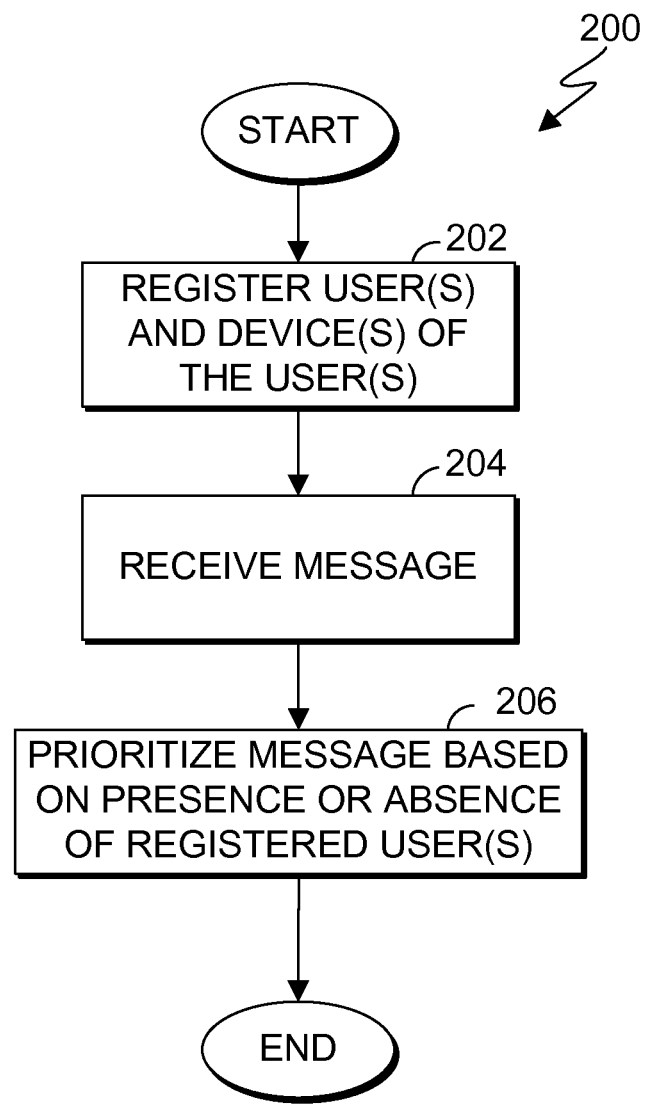
FIG. 2 is a flowchart illustrating operational steps of altering a prioritization schema, in accordance with an embodiment of the present invention.
Figure 3:
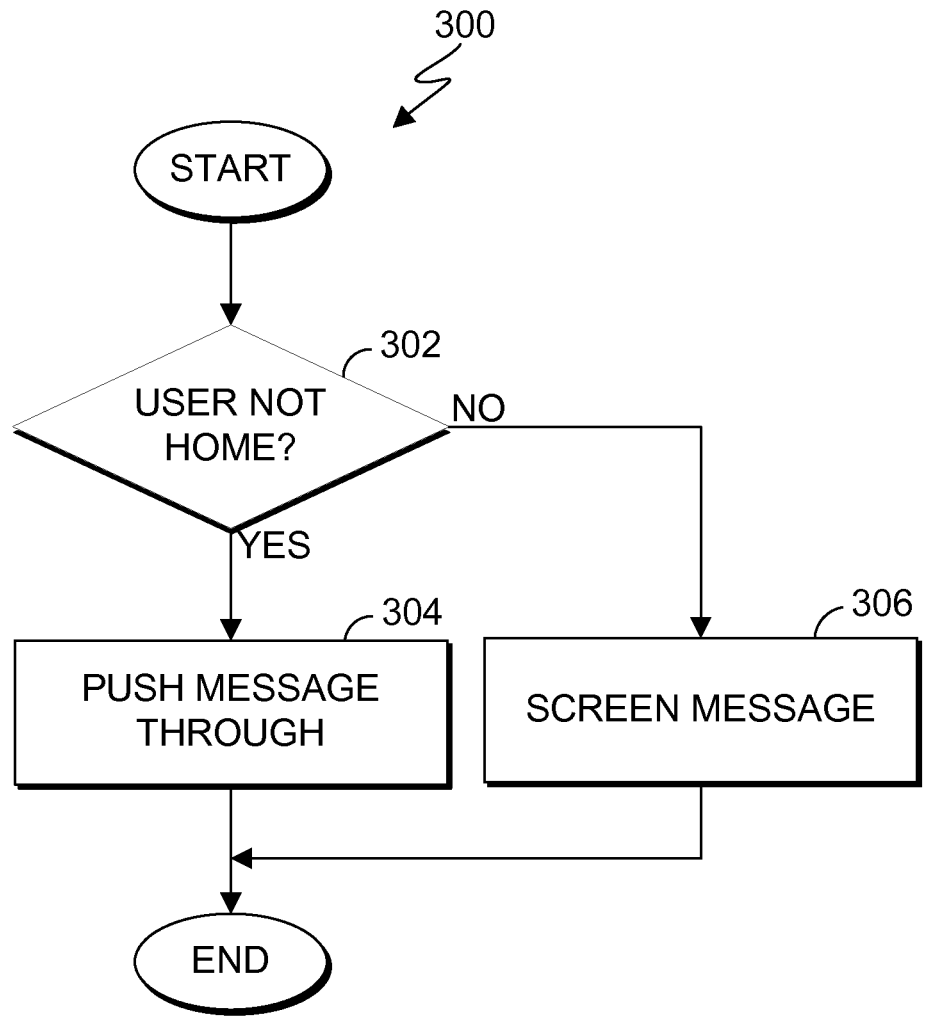
FIG. 3 is a flowchart illustrating operational steps for screening a message, in accordance with an embodiment of the present invention.

In other embodiments, screening application 104 can monitor the presence or absence of a known user associated with a registered device and disable an enabled screening feature of a different registered device to allow messages to be pushed through to the different registered device from an unregistered device, as discussed in greater detail with regard to FIGS. 2 and 3. For example, two mobile devices A and B, belonging to person alpha and beta, respectively could be registered with screening application 104 as being connected to a known network (e.g., their home Wi-Fi).

Person alpha has activated the screening feature on device A (i.e., person alpha does not want to be disturbed unless it is an emergency). Screening application 104 can detect that person beta leaves the house (and is subsequently disconnected from the known network). At some point person beta loses registered device B and needs to make a phone call to person alpha. Screening application 104 can, responsive to receiving a message intended for person alpha, push the message through to person alpha's device (registered device A) upon determining that person beta has left the home and registered device B has been disconnected from the network.

Mobile device 108 and 110 communicate with screening application 104 via network 106 to receive and screen messages. In general, mobile device 108 and 110 can be implemented with any device capable of sending and receiving messages. The term "messages", as used herein, refers to any communication medium known in the art. For example, a message can be a phone call, text message, e-mail, video call, video message, multimedia message service (MMS) message, etc. The phrase, "originating message device", as used herein, refers to a communication device (e.g., mobile device 108) that is used, for illustrative purposes, as a device that initiates a message. The phrase, "receiving message device", as used herein, refers to a communication device (e.g., mobile device 110) that is used as the device that receives a message. The receiving message device has a priority mode enabled. For illustrative purposes, this embodiment may be discussed with respect to mobile device 108 serving as the originating message device and mobile device 110 serving as the receiving message device. It should be understood that either mobile device can serve as the originating message device while the other serves as the receiving message device.

A "priority mode" refers to a mobile device feature that allows the mobile device to screen messages on behalf of a user. For example, in some embodiments a priority mode may enable a mobile device to receive some messages while ignoring others. In other embodiments, a priority mode may allow a loud ringtone for some messages while using a vibration alert for non-priority messages. In this embodiment, the priority mode is based, at least in part, on the registration of an originating message device and connectivity to a designated network (e.g., network 112), as discussed in greater detail with regard to FIGS. 2 and 3. In other embodiments, a priority mode may be implemented by any combination of hardware/software capable of screening messages.

In this embodiment, a priority mode can screen messages based on the type of message (i.e., phone call, text message, e-mail, video call, video message, etc.). For example, a priority mode can screen messages such as phone calls by sending the phone call to voicemail when enabled. In another example, a priority mode can screen messages such as email by disabling a ringtone and/or vibration accompanying a received e-mail.

Networks 106 and 112 can be, for example, a local area network (LAN), a wide area network (WAN) such as the Internet, or a combination of the two, and include wired, wireless, or fiber optic connections. In general, networks 106 and 112 can be any combination of connections and protocols that will support communications between computer system 102, mobile device 108, and mobile device 110, in accordance with a desired embodiment of the invention. For illustrative purposes, the following discussion is made with respect to network 106 serving as a cellular network and network 112 serving as a home network (e.g., Wi-Fi), it being understood that either can serve as a cellular network or home network.

FIG. 2 is a flowchart 200 illustrating operational steps of altering a prioritization schema, in accordance with an embodiment of the present invention.

In step 202, screening application 104 registers one or more users and devices of the users. In this embodiment, screening application 104 registers the one or more devices by associating the one users and devices of the users with a designated network and storing a unique identification ID number for each registered device. For example, screening application 104 can register two users of the two mobile devices (e.g., user A and user B) and two mobile devices (e.g., mobile device 108 and 110) to a network (e.g., network 112). In this embodiment, users and associated registered devices of users and registered networks are stored in a table. In other embodiments, the registered devices and networks can be stored in any known storage architecture known in the art. In this embodiment, the registered network can be any user-defined network. For example, a user may specify that the network be a home Wi-Fi network, a close family member's Wi-Fi network, etc. Accordingly, a user can then enable a priority call mode feature on the device of the user after registering one or more devices and selecting one or more networks.

In another example, a user may specify a network other than the home network of the user. For example, a user may designate a network associated with a loved one (e.g., a parent who lives in a different neighborhood, city, state, etc.) and register a mobile device of the loved one to that network.

In yet another example, a user may specify multiple networks designated as known networks. For example, a parent with mobile device A may have a child with mobile device B. The parent may specify their home network as a known network. The parent may also specify that the child's aunt's network is also a known network.

In step 204, screening application 104 receives a message. In this embodiment, screening application 104 receives a message from one or more devices. For example, screening application 104 can receive a message from mobile device 110. In other embodiments, screening application 104 can receive a message from one or more components of computing environment 100.

In step 206, screening application 104 prioritizes messages based, at least in part, on the presence or absence of a registered user. In this embodiment, screening application 104 prioritizes calls (i.e., alters a prioritization schema) by detecting registered devices and the presence or absence of a user associated with a registered device to the known network as discussed in greater detail with regard to FIG. 3. For example, a user can enable a priority mode (e.g., a screening feature) that will, by default, ignore all messages (e.g., a phone call, text message, video call, etc.) sent to the user's device (e.g., a mobile phone). In this embodiment, responsive to receiving a message from a registered device that has lost connectivity to the known network, screening application 104 can push a message originating from the registered device through to the receiving message device.

In another embodiment, responsive to receiving a message, screening application can prioritize a received message by pushing the message through regardless of the device's registration if the registered device has lost connectivity to the known network. For example, two mobile devices A and B, belonging to person alpha and beta, respectively could be registered with screening application 104 and registered as being connected to a known network (e.g., their home Wi-Fi). Person alpha has activated the screening feature on device A (i.e., person alpha does not want to be disturbed unless it is an emergency etc.). Person beta leaves the house (and is subsequently disconnected from the known network) and loses registered device B and needs to make a phone call to person alpha. Screening application 104 can, responsive to receiving a message intended for person alpha, push the message through upon determining that registered device B has been disconnected from the network.

FIG. 3 is a flowchart 300 illustrating operational steps for screening a message, in accordance with an embodiment of the present invention. For example, the operational steps of flowchart 300 can be performed at step 206 of flowchart 200.

In step 302, screening application 104 determines whether the user is not home. In this embodiment, screening application 104 determines that a user is not home by verifying that the device (i.e., a registered mobile device associated with a known user) is no longer connected to the designated network (e.g., network 112).

For example, two mobile devices A and B, belonging to person alpha and beta respectively, may be registered with screening application 104 and registered as being connected to a known network (e.g., their home Wi-Fi). Person alpha has activated the screening feature on device A (i.e., person alpha does not want to be disturbed unless it is an emergency from a family member/close friend/etc.). Subsequently, person beta leaves the home (i.e., travels far enough to lose connectivity to their home Wi-Fi) and needs to get in contact with person alpha. Screening application 104 could first determine whether the device person beta originates the call from is a registered device. Responsive to determining that the device person beta originates the call from is a registered device (e.g., device B), screening application 104 determines whether the registered device has lost connection to the registered, known network.

In another embodiment, screening application 104 can determine that a user is not home using facial recognition. For example, a user with a registered device may leave his phone at home (and thus still maintain connection to the designated network) while still leaving his home. Screening application 104 can determine that a registered user is not home responsive to receiving a facial recognition input that matches the face of the registered user. For example, screening application 104 can receive a facial recognition input from a web camera, security camera, etc. that is somewhere other than the user's home. Responsive to receiving a facial recognition input, screening application 104 can compare the facial recognition input to a stored database containing a picture of the face of the user and determine that the facial recognition input matches the picture on the stored database.

In yet another embodiment, screening application 104 can determine that a registered user is not home using smart keys/locks that are coded to an individual's key or passcode. In some instances, smart keys/locks may be locked and unlocked via an application on a user's phone. For example, when leaving home, a user will generally lock the door to secure the home. In some instances, the door can be locked using smart keys and/or locks. For example, a smart key can be coded to an individual registered user. A smart lock (i.e., a keypad based lock) could store several passwords associated with different individuals. Responsive to detecting that an individual registered user has used his/her key or password to lock the door, screening application 104 can verify that the user is not home.

If, in step 302, screening application 104 determines that the user is not home, then, in step 304, screening application 104 pushes the received message through. In other words, screening application 104 disables the enabled screening feature (i.e., priority mode) to allow messages (e.g., phone calls, text messages, video calls, emails, etc.) through to the receiving message device (e.g., mobile device 108). Accordingly, a user having a screening feature enabled can now receive messages from unregistered devices.

In this embodiment, screening application 104 can push through a message responsive to determining that the user is not home regardless of whether the device that originated the message is registered. For example, a user having a registered device may lose his phone and may need to reach his emergency contact (i.e., another user having a screening feature enabled) from another device (e.g., a friend's device whose device is not registered with screening application 104). Responsive to determining that the user is not home, screening application 104 can disable the enabled screening feature of the device belonging to the emergency contact to allow messages through (e.g., enable the ring tone or vibration to alert the emergency contact).

In another example, a user having a registered device may be involved in a traffic accident and may not be able to send a message to his emergency contact due to injury or unavailability of the user's phone. Emergency personnel may deduce the user's emergency contact and instead of using the user's phone, may try reaching the emergency contact via a landline at a hospital. Responsive to determining that the user is not home, screening application 104 can disable the enabled screening feature of the device belonging to the emergency contact to allow messages through.

In this embodiment, responsive to determining that user has subsequently returned home, screening application 104 can re-enable the screening feature previously activated by the user. For example, two mobile devices A and B, belonging to person alpha and beta respectively, may be registered with screening application 104 and be registered as being connected to a known network (e.g., their home Wi-Fi). Person alpha has activated the screening feature on device A (i.e., person alpha does not want to be disturbed unless it is an emergency from a family member/close friend etc.).

Subsequently, person beta leaves the home and device B loses charge (i.e., needs to be connected to a power source because the battery has no more power). Screening application 104 can identify person beta is not home by detecting that mobile device B has been disconnected from the known network. Responsive to detecting that person beta is not home, screening application 104 can disable the screening feature activated on mobile device A to enable messages to be received from any device capable of sending a message (presumably from person beta).

When person beta returns home and connects mobile device B to a power source, screening application 104 can confirm that person beta is at home via the connection of mobile device B to the known network (e.g., the home Wi-Fi). Responsive to confirming that person beta is at home, screening application 104 can then re-enable the screening feature previously activated on mobile device A by person alpha.

If, in step 302, screening application 104 determines that the user is at home, then, in step 306, screening application 104 screens the call. In other words, screening application 104 will not push the message communication through to the receiving message device (e.g., mobile device 108). In this embodiment, screening application 104 screens the received message based, at least in part, on the communication medium. For example, if the communication is a phone call, screening application 104 forwards the call to a voice message of the device of the user. In another example, if the communication is a text message, screening application 104 allows the message to be sent but disables the ringtone or vibration of the device having the screening feature enabled.

Accordingly, by performing the operational steps of FIG. 3, screening application 104 alters a prioritization schema to allow messages to be pushed through to a device having an enabled screening feature responsive to determining that a user is not home. In this embodiment, screening application 104 determines that a user is not home by determining that the registered device has lost connectivity to the selected, known, network. Altering a prioritization schema to allow messages to be pushed through to a device having an enabled screening feature can facilitate communication of important information despite originating from an unknown, unregistered device in the event of an emergency. For example, a person possessing a registered device who may have lost the registered device can still communicate with his emergency contact (e.g., his father) despite not having a registered device that would normally bypass the screening feature enabled on his emergency contact's phone.

Figure 4:
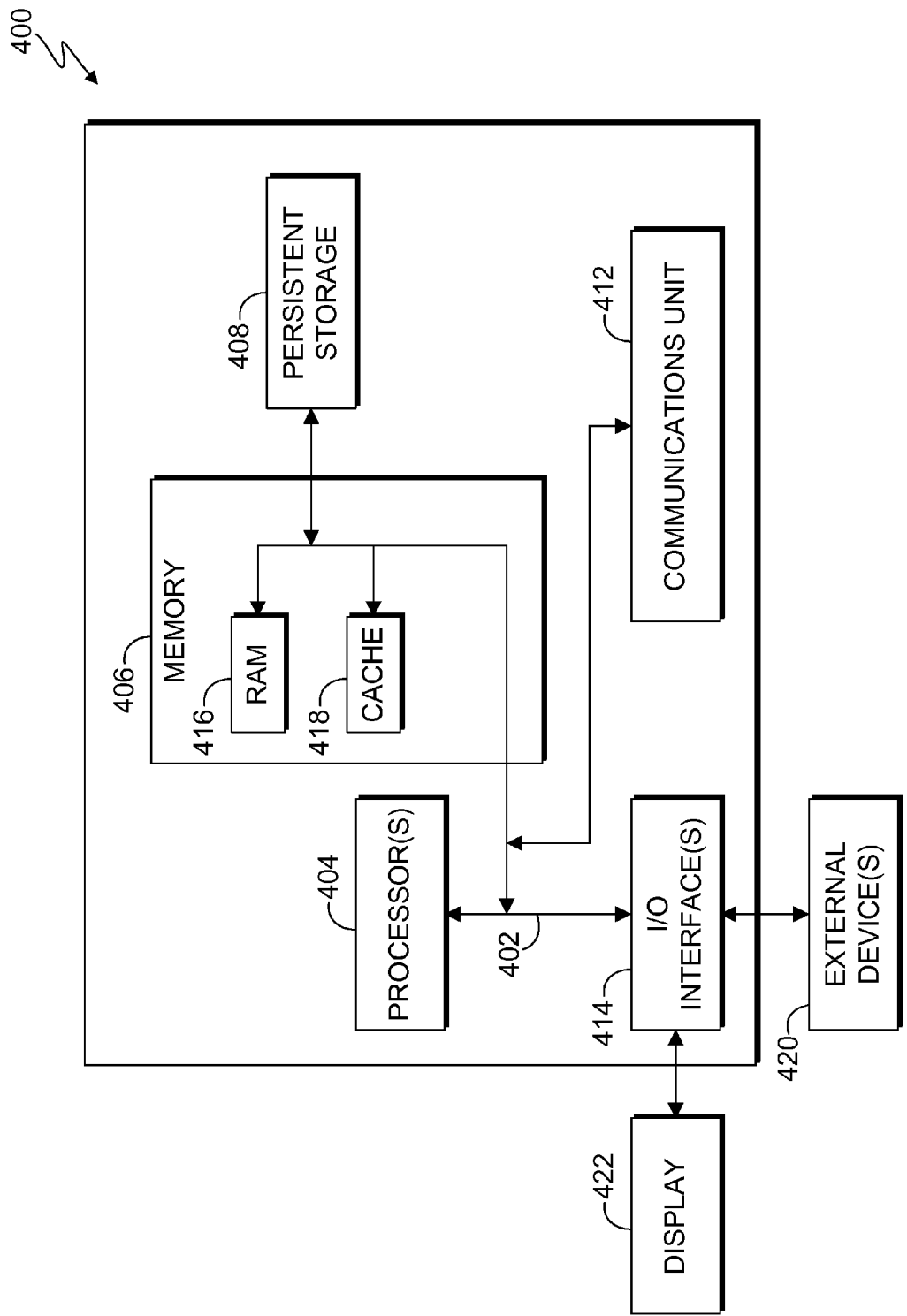
FIG. 4 is a block diagram of internal and external components of the computer systems of FIG. 1, in accordance with an embodiment of the present invention.

FIG. 4 is a block diagram of internal and external components of a computer system 400, which is representative of the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 106). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    associating, by one or more computer processors, a first user with one or more identified networks, wherein the first user connects to the one or more identified networks using one or more mobile devices;
    detecting, by one or more computer processors, the first user's absence from the one or more identified networks; and
    responsive to detecting the first user's absence from the one or more identified networks, increasing, by one or more computer processors, an amount of priority of the first user's communications to a second user.

2. The method of claim 1, wherein detecting, by one or more computer processors, the first user's absence from the one or more identified networks comprises:
    identifying, by one or more computer processors, the one or more mobile devices associated with the first user are not connected to the one or more identified networks.

3. The method of claim 1, wherein detecting, by one or more computer processors, the first user's absence from the one or more identified networks comprises:
  receiving, by one or more computer processors, facial recognition input from a source other than the one or more identified networks;
  comparing, by one or more computer processors, the facial recognition input to a picture of the first user; and
  identifying, by one or more computer processors, that the facial recognition input matches the picture of the first user.

4. The method of claim 1, wherein detecting, by one or more computer processors, the first user's absence from the one or more identified networks comprises:
  identifying, by one or more computer processors, a code associated with the first user; and
  identifying, by one or more computer processors, that the code has been inputted.

5. The method of claim 1, wherein responsive to detecting the first user's absence from the one or more identified networks, increasing, by one or more computer processors, an amount of priority of the first user's communications to a second user comprises:
  disabling, by one or more computer processors, an enabled screening feature of a mobile device associated with the second user.

6. The method of claim 5, further comprising:
  permitting, by one or more computer processors, one or more messages to be sent from the first user to the second user.

7. The method of claim 1, further comprising:
  responsive to detecting the first user is present on the one or more identified networks, re-enabling, by one or more computer processors, a screening feature of a mobile device associated with the second user.

8. A computer program product comprising:
  one or more computer readable storage media and program instructions stored on the one or more computer readable storage media, the program instructions comprising:
    program instructions to associate a first user with one or more identified networks, wherein the first user connects to the one or more identified networks using one or more mobile devices;
    program instructions to detect the first user's absence from the one or more identified networks; and
    program instructions to, responsive to detecting the first user's absence from the one or more identified networks, increase an amount of priority of the first user's communications to a second user.

9. The computer program product of claim 8, wherein the program instructions to detect the first user's absence from the one or more identified networks comprise:
  program instructions to identify the one or more mobile devices associated with the first user are not connected to the one or more identified networks.

10. The computer program product of claim 8, wherein the program instructions to detect the first user's absence from the one or more identified networks comprise:
  program instructions to receive facial recognition input from a source other than the one or more identified networks;
  program instructions to compare the facial recognition input to a picture of the first user; and
  program instructions to identify that the facial recognition input matches the picture of the first user.

11. The computer program product of claim 8, wherein the program instructions to detect the first user's absence from the one or more identified networks comprise:
  program instructions to identify a code associated with the first user; and
  program instructions to identify that the code has been inputted.

12. The computer program product of claim 8, wherein the program instructions to, responsive to detecting the first user's absence from the one or more identified networks, increase an amount of priority of the first user's communications to a second user comprise:
  program instructions to disable an enabled screening feature of a mobile device associated with the second user.

13. The computer program product of claim 12, wherein the program instructions stored on the one or more computer readable storage media further comprise:
  program instructions to permit one or more messages to be sent from the first user to the second user.

14. The computer program product of claim 8, wherein the program instructions stored on the one or more computer readable storage media further comprise:
  program instructions to, responsive to detecting the first user is present on the one or more identified networks, re-enable a screening feature of a mobile device associated with the second user.

15. A computer system comprising:
  one or more computer processors;
  one or more computer readable storage media; and
  program instructions stored on the one or more computer readable storage media for execution by at least one of the one or more computer processors, the program instructions comprising:
    program instructions to associate a first user with one or more identified networks, wherein the first user connects to the one or more identified networks using one or more mobile devices;
    program instructions to detect the first user's absence from the one or more identified networks; and
    program instructions to, responsive to detecting the first user's absence from the one or more identified networks, increase an amount of priority of the first user's communications to a second user.

16. The computer system of claim 15, wherein the program instructions to detect the first user's absence from the one or more identified networks comprise:
  program instructions to identify the one or more mobile devices associated with the first user are not connected to the one or more identified networks.

17. The computer system of claim 15, wherein the program instructions to detect the first user's absence from the one or more identified networks comprise:
  program instructions to receive facial recognition input from a source other than the one or more identified networks;
  program instructions to compare the facial recognition input to a picture of the first user; and
  program instructions to identify that the facial recognition input matches the picture of the first user.

18. The computer system of claim 15, wherein the program instructions to detect the first user's absence from the one or more identified networks comprise:
  program instructions to identify a code associated with the first user; and
  program instructions to identify that the code has been inputted.

19. The computer system of claim 15, wherein the program instructions to, responsive to detecting the first user's absence from the one or more identified networks, increase an amount of priority of the first user's communications to a second user comprise:
   program instructions to disable an enabled screening feature of a mobile device associated with the second user.

20. The computer system of claim 19, wherein the program instructions stored on the one or more computer readable storage media further comprise:
   program instructions to permit one or more messages to be sent from the first user to the second user.

\* \* \* \* \*